United States Patent
Ho et al.

(10) Patent No.: US 10,112,148 B2
(45) Date of Patent: Oct. 30, 2018

(54) MEMBRANE BIOREACTOR SYSTEM USING RECIPROCATING MEMBRANE

(71) Applicant: DOOSAN HEAVY INDUSTRIES & CONSTRUCTION CO., LTD., Changwon-si, Gyeongsangnam-do (KR)

(72) Inventors: Jaeho Ho, Tampa, FL (US); Shaleena Smith, Temple Terrace, FL (US); Gyu Dong Kim, Tampa, FL (US); Jaren Patamasank, Lakeland, FL (US); Petia Tontcheva, Brandon, FL (US); Hyung Keun Roh, Tampa, FL (US)

(73) Assignee: DOOSAN HEAVY INDUSTRIES & CONSTRUCTION CO., LTD., Changwon-si (KR)

( * ) Notice: Subject to any disclaimer, the term of this patent is extended or adjusted under 35 U.S.C. 154(b) by 0 days.

(21) Appl. No.: 15/853,025

(22) Filed: Dec. 22, 2017

(65) Prior Publication Data

US 2018/0117534 A1    May 3, 2018

Related U.S. Application Data

(63) Continuation of application No. 13/874,016, filed on Apr. 30, 2013, now Pat. No. 9,884,295.

(Continued)

(51) Int. Cl.
*B01D 65/02* (2006.01)
*B01D 65/08* (2006.01)
(Continued)

(52) U.S. Cl.
CPC .............. *B01D 65/02* (2013.01); *B01D 65/08* (2013.01); *C02F 1/34* (2013.01); *C02F 3/1273* (2013.01);
(Continued)

(58) Field of Classification Search
None
See application file for complete search history.

(56) References Cited

U.S. PATENT DOCUMENTS 2,024,426 A    12/1935  Butler
3,175,687 A     3/1965  Jones
(Continued)

FOREIGN PATENT DOCUMENTS

JP    2994768 B2    9/1992
JP    H04260421 A   9/1992

OTHER PUBLICATIONS

Ho et al., "Pilot Demonstration of Energy-Efficient Membrane Bioreactor (MBR) Using Reciprocating Submerged Membrane," Water Environment Research 87(3) (Mar. 2015) 266-273, 8 pages. (Year: 2015).*

(Continued)

*Primary Examiner* — Bobby Ramdhanie
*Assistant Examiner* — Denise R Anderson
(74) *Attorney, Agent, or Firm* — Sughrue Mion, PLLC

(57) ABSTRACT

The present invention relates to membrane bioreactor ("MBR") system that includes a mechanical membrane reciprocation system to reduce or eliminate membrane fouling. The disclosed MBR system can be operated with higher flux and lower fouling than MBR systems using air scouring. Furthermore the system can remove nitrogen and phosphorous with one RAS and one or no internal recirculation line. The membrane can be reciprocated by a low RPM motor connected to a pulley via belt to rotate rotor to convert rotational motion into reciprocating motion of membrane. Various mechanical means can also be employed to create the reciprocating motion.

2 Claims, 5 Drawing Sheets

Related U.S. Application Data

(60) Provisional application No. 61/711,081, filed on Oct. 8, 2012.

(51) Int. Cl.
  *C02F 1/34* (2006.01)
  *C02F 3/12* (2006.01)
  *C02F 3/30* (2006.01)

(52) U.S. Cl.
  CPC .. *B01D 2315/06* (2013.01); *B01D 2321/2058* (2013.01); *C02F 3/1263* (2013.01); *C02F 3/302* (2013.01); *C02F 3/308* (2013.01); *C02F 2203/006* (2013.01); *C02F 2303/20* (2013.01); *Y02W 10/15* (2015.05)

(56) References Cited

U.S. PATENT DOCUMENTS

| | | | |
|---|---|---|---|
| 3,491,021 A | 1/1970 | Huntington | |
| 4,867,883 A | 9/1989 | Daigger et al. | |
| 4,872,988 A | 10/1989 | Culkin | |
| 4,952,317 A * | 8/1990 | Culkin | B01D 63/16 210/321.67 |
| 5,014,564 A | 5/1991 | Culkin | |
| 5,047,149 A | 9/1991 | Degremont | |
| 5,076,305 A | 12/1991 | Williams | |
| 5,480,548 A | 1/1996 | Daigger et al. | |
| 5,601,719 A | 2/1997 | Hawkins et al. | |
| 5,725,767 A | 3/1998 | Culkin | |
| 5,744,037 A | 4/1998 | Fujimura et al. | |
| 5,759,401 A | 6/1998 | Boussely et al. | |
| 5,833,856 A | 11/1998 | Liu et al. | |
| 5,853,589 A | 12/1998 | Desjardins et al. | |
| 5,932,099 A | 8/1999 | Cote et al. | |
| 5,958,243 A | 9/1999 | Lawrence et al. | |
| 5,985,160 A | 11/1999 | DiLeo et al. | |
| 6,156,200 A | 12/2000 | Zha et al. | |
| 6,322,698 B1 | 11/2001 | Rios et al. | |
| 6,406,629 B1 | 6/2002 | Husain et al. | |
| 6,409,944 B1 | 6/2002 | Degremont | |
| 6,485,645 B1 | 11/2002 | Husain et al. | |
| 6,712,970 B1 | 3/2004 | Trivedi | |
| 6,872,301 B2 | 3/2005 | Schepis | |
| 6,890,431 B1 | 5/2005 | Eades et al. | |
| 7,122,121 B1 | 10/2006 | Ji | |
| 7,169,301 B2 | 1/2007 | Vion | |
| 7,175,768 B2 | 2/2007 | Vion | |
| 7,252,765 B2 | 8/2007 | Barnard | |
| 7,282,147 B2 | 10/2007 | Kirker et al. | |
| 7,285,215 B2 | 10/2007 | Barnard | |
| 7,294,274 B2 | 11/2007 | Kirker et al. | |
| 7,297,278 B2 | 11/2007 | Steele et al. | |
| 7,326,343 B2 | 2/2008 | Nakhla et al. | |
| 7,344,643 B2 | 3/2008 | Elefritz, Jr. et al. | |
| 7,445,709 B2 | 11/2008 | Beaule et al. | |
| 7,455,765 B2 | 11/2008 | Elefritz et al. | |
| 7,537,696 B2 | 5/2009 | Arnaud | |
| 7,561,014 B2 | 7/2009 | Johnson et al. | |
| 7,651,620 B2 | 1/2010 | Degremont | |
| 7,815,780 B2 | 10/2010 | Djordjevic | |
| 7,850,851 B2 | 12/2010 | Zha et al. | |
| 7,887,702 B2 | 2/2011 | Park et al. | |
| 7,931,808 B2 | 4/2011 | Elefritz, Jr. et al. | |
| 7,935,259 B2 | 5/2011 | Gavalas | |
| 7,951,555 B2 | 5/2011 | Taylor et al. | |
| 7,981,287 B2 | 7/2011 | Lambert et al. | |
| 8,114,296 B2 | 2/2012 | Chao | |
| 8,133,396 B2 | 3/2012 | Crowell | |
| 8,287,733 B2 | 10/2012 | Nick et al. | |
| 2005/0023219 A1 | 2/2005 | Kirker et al. | |
| 2005/0077227 A1 | 4/2005 | Kirker et al. | |
| 2009/0211974 A1 | 8/2009 | Bonnelye et al. | |
| 2010/0038314 A1 | 2/2010 | Vion et al. | |
| 2010/0042389 A1 | 2/2010 | Farruggia et al. | |
| 2010/0096325 A1 | 4/2010 | Tsukahara et al. | |
| 2010/0108584 A1 | 5/2010 | Magnanini | |
| 2010/0116736 A1 | 5/2010 | Wiemers et al. | |
| 2010/0116737 A1 | 5/2010 | Wiemers et al. | |
| 2010/0187186 A1 | 7/2010 | Howdeshell et al. | |
| 2011/0084012 A1 | 4/2011 | Yang et al. | |
| 2011/0165677 A1 | 7/2011 | Brod et al. | |
| 2011/0192801 A1 | 8/2011 | Jeanmarie et al. | |
| 2012/0193294 A1 | 8/2012 | Amato et al. | |
| 2012/0211407 A1 | 8/2012 | Anderson | |
| 2012/0211431 A1 | 8/2012 | Hayes et al. | |
| 2012/0211905 A1 | 8/2012 | Hayes | |

OTHER PUBLICATIONS

Camargo et al. "Treatment of low-strength wastewater using immobilized biomass in a sequencing batch external loop reactor: Influence of the medium superficial velocity on the stability and performance"; Brazilian Journal of Chemical Engineering; vol. 19, No. 3, 2002, p. 267-275; p. 268, col. 2, paragraph 3.

Communication dated Jan. 26, 2017 issued by the Canadian Intellectual Property Office in counterpart application No. 2,887,437.

European Search Report corresponding to application No. 13845471.5 dated Feb. 12, 2016.

European Search Report corresponding to application No. 15170827.8 dated Feb. 2, 2016.

International Search Report dated Feb. 12, 2014 issued in PCT/US13/63708.

Slocum, http://web.mitedu/2.75/fundamentals/FUNdaMENTALs/020Book°/020pdf/FUNdaMENTALs°/020Topie/0205.PDF, Jan. 1, 2008, accessed on the Internet on Nov. 14, 2016, 62 pages.

Kola et al., J. Membrane Science 409-410 (2012) 54-65, 12 pages.

Ho et al., "Pilot Demonstartion of Energy-Efficient Membrane Reactor (MBR) Using Reciprocating Submerged Membrane," Water Envoronment Research 87(3) (Mar. 2015) 266-273, 8 pages.

A. Kola, et al., Application of Low Frequency Transverse Vibration on Fouling Limitation in Submerged Hollow Fibre Membranes, J. Membr_ Sci. (2012), doi: 10.1016/j.memsci.2012.03.017, 12 pages.

\* cited by examiner

MEMBRANE BIOREACTOR SYSTEM USING RECIPROCATING MEMBRANE

RELATED APPLICATION DATA

This is a Continuation of U.S. patent application Ser. No. 13/874,016, filed Apr. 30, 2013 (allowed), which claims priority to application Ser. No. 61/711,081 filed on Oct. 8, 2012 and entitled "Vibration Membrane Bioreactor System Using Reciprocating Motion To Treat Wastewater." The entire disclosures of the prior applications are considered part of the disclosure of the accompanying continuation application, and are hereby incorporated by reference.

BACKGROUND OF THE INVENTION

Field of the Invention

This invention relates to a membrane bioreactor ("MBR") system to treat wastewater. More particularly, the present invention relates to a MBR system that employs a repetitive back and forth motion (hereafter called the "reciprocating motion" or "reciprocation") of a submerged membrane to increase filtration and nutrients removal efficiencies instead of membrane air scouring which is commonly utilized in submerged MBR.

Description of the Background Art

The background art contains several examples of MBR systems. These systems utilize biological treatment processes (e.g. activated sludge processes) to remove contaminants from wastewater. Several modified activated sludge processes can be used alone or in series for improved removal of nutrients in the MBR. Known MBR systems also use low pressure microfiltration (MF) or ultrafiltration (UF) membranes as a physical barrier for a complete solid-liquid separation. The UF or MF membranes can be submerged in a bioreactor or external to the bioreactor. Submerged membranes are typically installed in an aerobic bioreactor or a separate membrane tank. Membrane air scouring is of utmost importance in submerged MBR operation to prevent severe and rapid membrane fouling. By way of these known techniques, MBR systems can achieve secondary and tertiary wastewater treatment.

One advantage of known MBR systems is the direct production of tertiary quality effluent with the treatment of domestic or industrial wastewater. Another reason for the growing interest in MBR technology is its smaller footprint compared to conventional treatment processes. For example, using conventional MBR systems, a treatment plant could potentially double its capacity without increasing its overall footprint. MBR technology is not only limited to domestic wastewater, but it can also be applied to treat industrial wastewater for reuse.

An example of an MBR system is disclosed in U.S. Pat. No. 4,867,883 to Daigger. This reference discloses a high-rate biological waste water treatment process for removing organic matter, phosphorus and nitrogen nutrients from municipal waste water. A further MBR system is disclosed is U.S. Pat. No. 8,287,733 to Nick et al. It discloses a system utilizing first and second anoxic basins and first and second aerobic basins. Also disclosed is the use of a membrane chamber for housing a plurality of membrane tanks.

One common drawback of known MBR systems is membrane fouling. This occurs when soluble and particulate materials accumulate on the membrane surface. When such fouling occurs, there is either a marked decline in permeate passing through the membrane or an increase in the trans-membrane pressure. In either event, the result is a dramatic reduction in system performance. Membrane fouling is especially problematic in MBR systems given that they generally operate with higher mixed liquor suspended solids ("MLSS").

One solution to membrane fouling is air scouring. Vigorous air scouring allows for stable flux operation without rapid and permanent fouling and especially cake layer buildup. Given the higher MLSS concentrations at which MBR systems operate, frequent maintenance cleanings and out of tank cleanings are also important to maintain membrane performance in terms of fouling and permeability. Air scouring is not optimal as it is energy intensive. In MBR systems energy consumption is considerably higher than conventional activated sludge systems due to the additional air scouring for the membrane.

Thus, there exists a need in the art for improved MBR systems that eliminate or reduce membrane fouling and that do not rely upon air scouring. The present invention is aimed at fulfilling these and other needs in the art.

SUMMARY OF THE INVENTION

It is therefore one of the objectives of this invention to reduce or eliminate membrane fouling in an MBR system.

It is a further object of this invention to provide a MBR system that does not utilize membrane air scouring.

It is also one of the objectives of this invention to reduce or eliminate the presence of dissolved oxygen in return activated sludge (RAS) by not utilizing air scouring in membrane tank, thereby permitting the activated sludge to be returned from a membrane tank to an anoxic or anaerobic treatment tank.

It is still yet another object of this invention to operate MBRs with higher efficiencies in membrane filtration and biological nutrients removal via the reciprocation of a membrane.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

PARTS LIST

| | |
|---|---|
| 10 | Influent |
| 20 | Mixed Liquor Flow |
| 21 | Anaerobic to Anoxic Flow |
| 22 | Anoxic to Aerobic Flow |
| 23 | Aerobic to Membrane Tank Flow |
| 24 | Anoxic to Anaerobic Flow |
| 25 | Anaerobic to Aerobic Flow |
| 30 | Activated Sludge Return |
| 31 | Activated Sludge Return (Membrane Tank to Anoxic) |
| 32 | Internal Recirculation (Anoxic to Anaerobic) |
| 33 | Activated Sludge Return (Membrane Tank to Anaerobic) |
| 34 | Internal Recirculation (Aerobic to Anoxic) |
| 40 | Effluent |
| 50 | Biological Treatment Train |
| 51 | Anaerobic Tank |
| 52 | Anoxic Tank |
| 53 | Aerobic Tank |
| 60 | Membrane Tank |
| 70 | Submerged Membrane, membrane cassette |
| 80 | Reciprocation Apparatus |
| 90 | Sliding Frame |
| 91 | Linear Bearing with Pillow Block |
| 92 | Sliding Rail |
| 93 | Membrane Cassette Connection Point |
| 94 | Dampener |
| 100 | Rotor |
| 101 | Pulley |
| 102 | Belt |
| 103 | Low RPM motor |
| 110 | Shaft |

DETAILED DESCRIPTION OF THE PREFERRED EMBODIMENT

The present invention relates to membrane bioreactor ("MBR") system that includes a mechanical apparatus for reciprocating a membrane cage (or membrane cassettes) back and forth. The apparatus eliminates the use of air scouring. Repetitive reciprocation of the membrane cage/cassette creates an inertia force acting on the membrane fibers, which shakes foulants off from the membrane surface. The system includes a membrane cage/cassette containing membrane modules that are submerged in either an aerobic tank or a separate membrane tank. The membrane cage/cassette can be mechanically reciprocated via reciprocation apparatus, which enable the disclosed MBR system to be operated with higher flux and lower fouling than MBR systems using air scoring. Various mechanical means can be employed to create the reciprocating motion. The various details of the present invention, and the manner in which they interrelate, are described in greater detail hereinafter.

Figure 1:
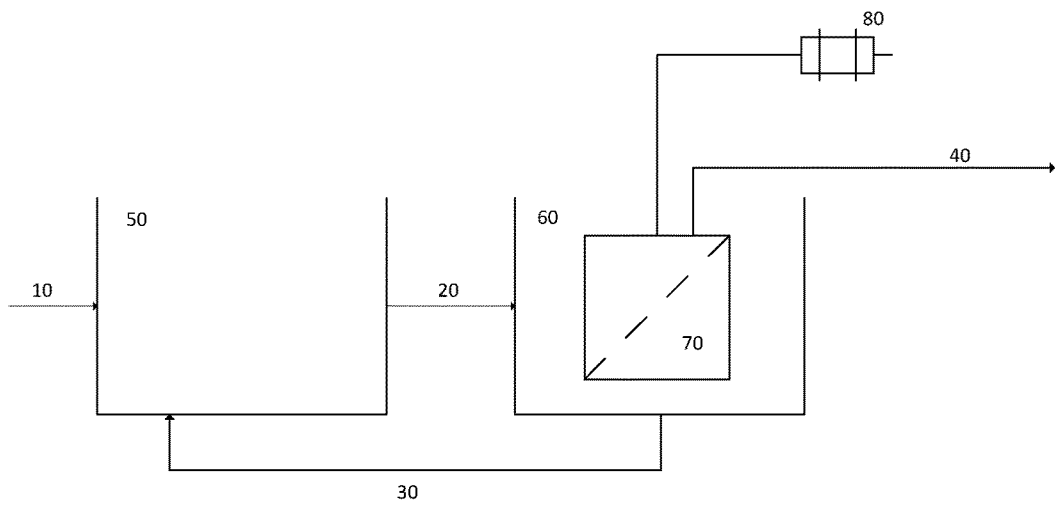
FIG. 1 is a general process diagram illustrating the MBR system of the present invention.

FIG. 1 illustrates the basic components of the disclosed vibration MBR system. The system includes a biological treatment train 50 for receiving influent 10 to be processed. Various anaerobic, anoxic, and aerobic biological treatment processes can be carried out within treatment train 50. Mixed liquor 20 from treatment train 50 is then passed into membrane tank 60. Membrane tank 60 includes a submerged membrane 70 (or a series of membranes 70). Membrane(s) 70 may be, for example, a low pressure microfiltration (MF) or ultrafiltration (UF) membrane used as a physical barrier for a complete solid-liquid separation. Membrane cage/cassette 70 is mechanically interconnected to a reciprocation apparatus 80. In accordance with the invention, reciprocation apparatus 80 is used in reciprocating membrane 70. Reciprocation apparatus 80, in one non-limiting embodiment, uses a mechanical device for converting rotational motion into reciprocating motion. Filtration through membrane 70 in membrane tank 60 produces effluent 40. Membrane 70 may be continually reciprocated during filtration. Alternatively, membrane 70 can be selectively reciprocated as need to eliminate fouling. A portion of the activated sludge 30 (i.e. return activated sludge or "RAS") goes back to biological treatment train 50 to maintain a sludge concentration within train 50.

Figure 2:
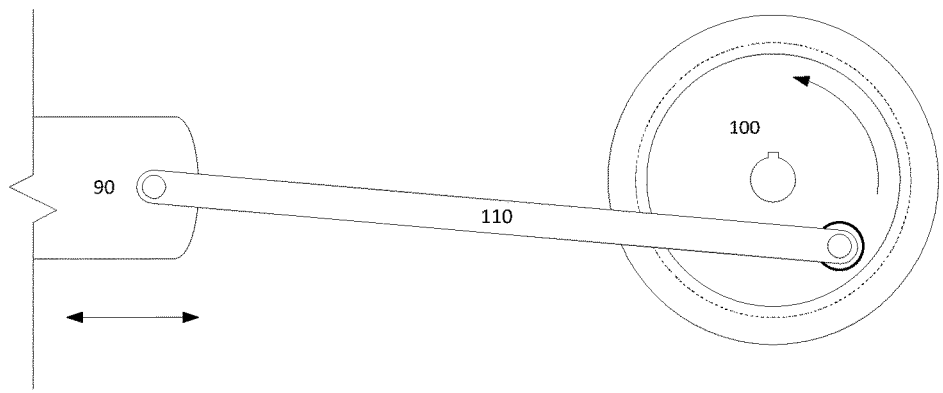
FIG. 2 is a general embodiment of the reciprocation apparatus of the present invention.

FIG. 2 illustrates a general embodiment of the reciprocation apparatus 80. Membrane cassette 70 can be connected to a sliding frame 90. A motorized rotor 100 is connected to a sliding frame 90 via shaft 110. The depicted apparatus 80 thereby converts the rotational motion of rotor 100 into the reciprocating motion of the sliding frame 90. The frequency of reciprocation will be dictated by the speed at which rotor 100 is rotated.

Figure 3:
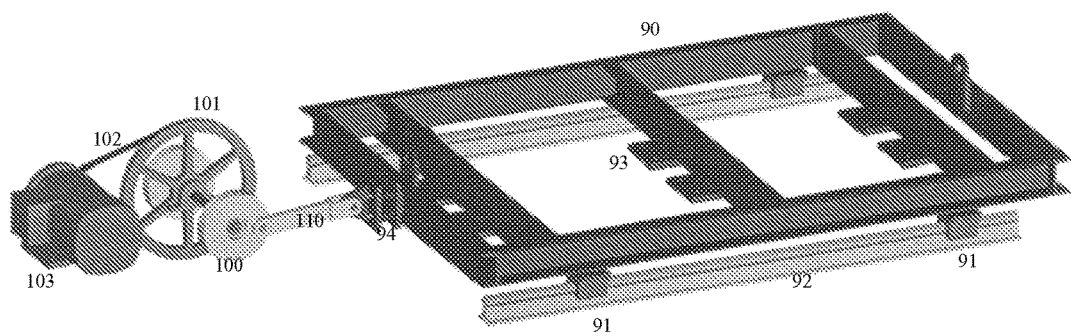
FIG. 3 is a detailed view of an alternative embodiment of the reciprocation apparatus.
Figure 4:
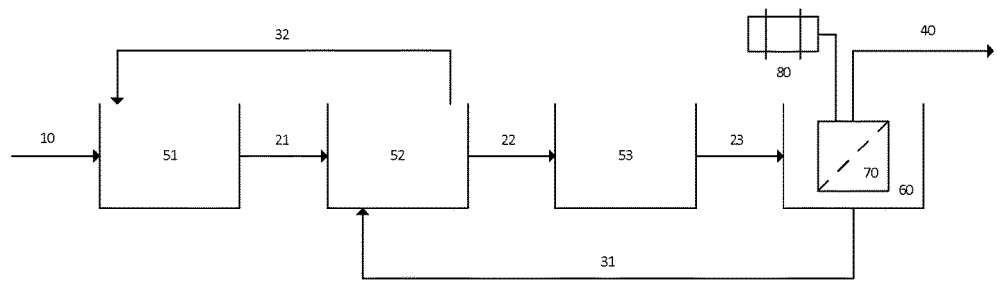
FIGS. 4-12 are process diagrams illustrating various alternative MBR processes of the present invention.

An alternative embodiment of such an apparatus is depicted in FIG. 3 and includes a low RPM motor 103 connected to a pulley 101 via belt 102 to rotate rotor 100 to convert rotational motion into reciprocating motion of sliding frame 90 through a shaft 110. Shock load due to reciprocating motion can be reduced by dampener 94 in between sliding frame 90 and shaft 110. Sliding frame 90 can move along sliding rail 92 with linear bearing and pillow block 91 supports (FIG. 3). There are many different types of mechanical equipment that can provide the required reciprocal motion. Those of ordinary skill in the art will appreciate other suitable mechanical devices after considering the invention.

Various alternative embodiments of the present process invention are described in connection with FIGS. 4-12. With regard to FIG. 4, the system consists of a series of biological treatment tanks. These include anaerobic treatment tank 51, anoxic treatment tank 52, aerobic treatment tank 53, and membrane tank 60. The membrane 70 is submerged within membrane tank 60 and can is reciprocated by reciprocation apparatus 80.

The anaerobic treatment tank 51 receives influent 10 to be treated. Thereafter anaerobic treatment tank 51 biologically treats the influent in the absence of dissolved oxygen to release phosphorous for luxury uptake in the following aerobic conditions. In anoxic tank 52 the wastewater is denitrified in oxygen-depleted conditions. Dissolved oxygen is excluded from anoxic tank 52, although chemically bound oxygen may be present. Nitrification and luxury phosphorous uptake occur in the Aerobic treatment tank 53 in the presence of dissolved oxygen. Filtration in the membrane tank 60 produces effluent 40.

There are two recirculation lines for the activated sludge. A line 31 delivers return activated sludge (or "RAS") from membrane tank 60 to anoxic tank 52. Additionally, an internal recycle line 32 delivers a portion of the activated sludge from anoxic tank 52 to anaerobic tank 51 to maintain mixed liquor suspended solids (or "MLSS"). In this invention, RAS takes two roles in conventional activated sludge or MBR processes. In prior art systems, the return flow of activated sludge from membrane tank contains dissolved oxygen ("DO"). Thus, in prior art systems, the activated sludge from the membrane tank could not be returned to the anoxic 52 or anaerobic 51 tanks due to the high amounts of dissolved oxygen effects on denitrification or phosphorous release. However, with regard the present invention, since physical membrane reciprocation is utilized instead of vigorous air bubbling, the DO in the RAS is minimal compared to conventional MBR. Therefore, only one sludge return line is required for both sludge and nitrate return in the present invention.

Figure 5:
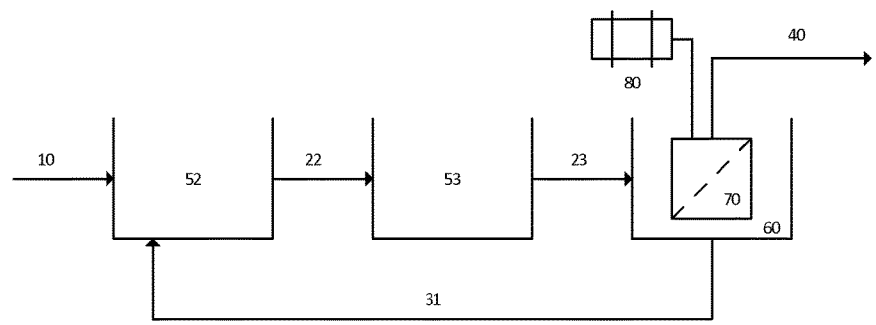
Figure 6:
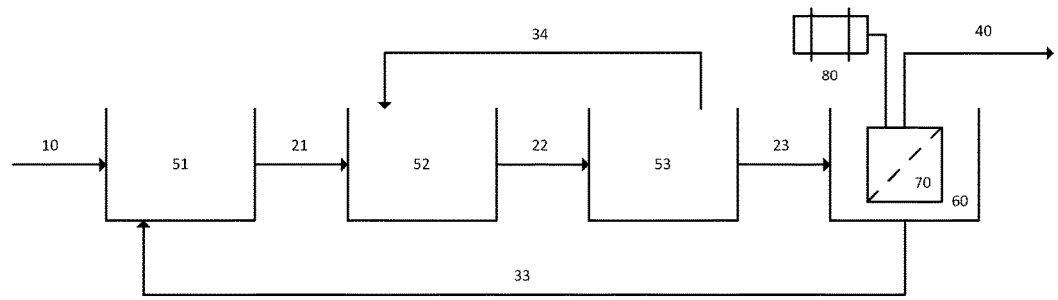
Figure 7:
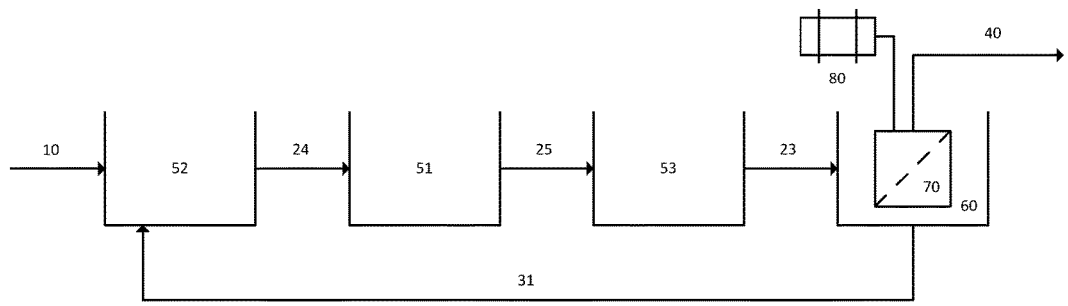
Figure 8:
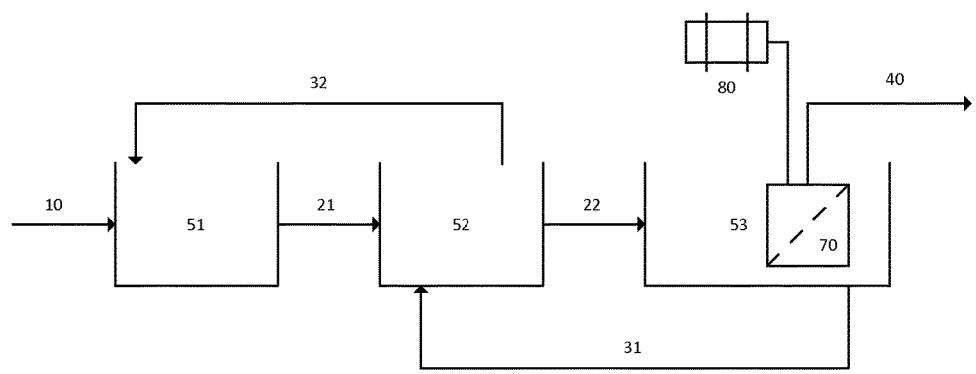
Figure 9:
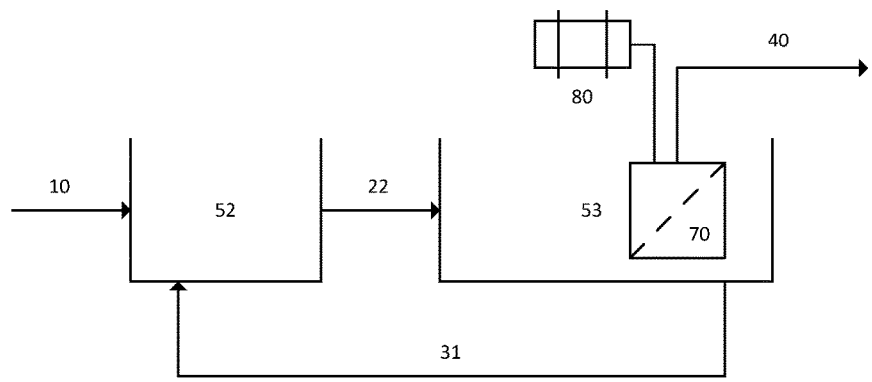
Figure 10:
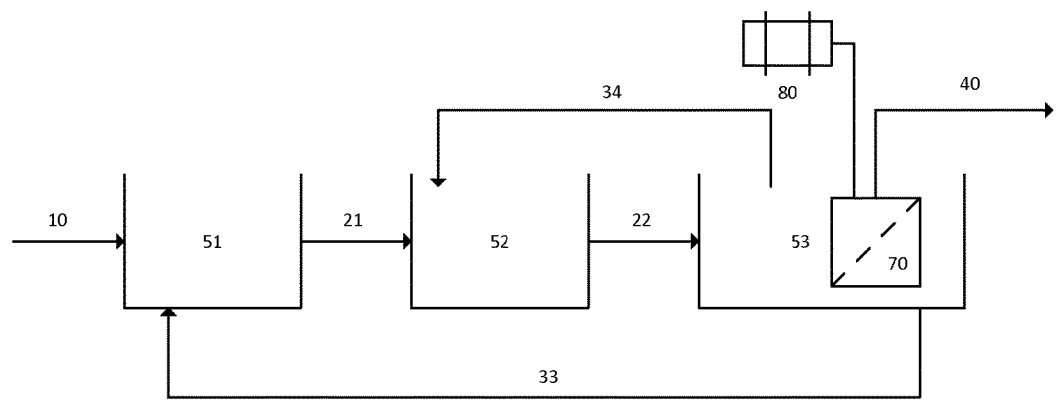
Figure 11:
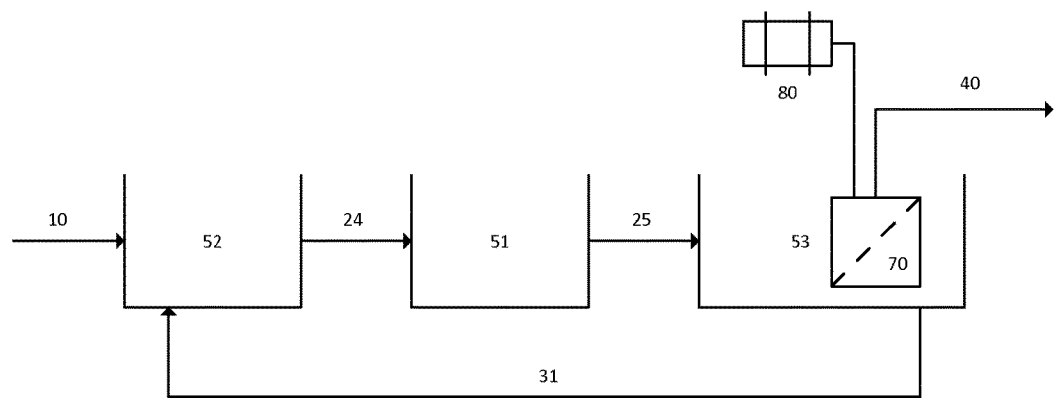
Figure 12:
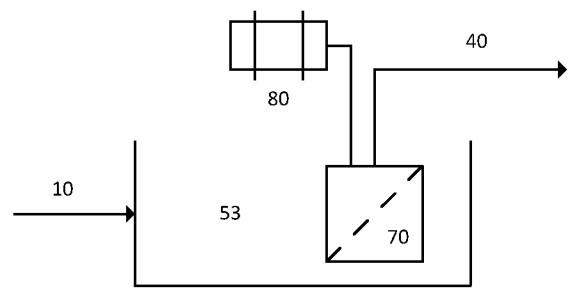

The system depicted in FIG. 5 includes anoxic 52 and aerobic 53 treatment tanks which is similar to the well-known Modified Ludzack and Ettinger (MLE) process. As described above, RAS 31 goes to anoxic tank 52 directly from membrane tank 60 for nitrate and sludge return in this invention. FIG. 6 represents another embodiment which consists of same reactors depicted in FIG. 4. However, return activated sludge 33 goes to anaerobic 51 treatment tank and an internal recycle 34 is made in between aerobic 53 and anoxic 52 tanks. FIG. 7 illustrates an embodiment similar to the process described in FIG. 6. However, there is no internal recirculation and the RAS goes to the anoxic tank where denitrification occurred. FIGS. 8, 9, 10 and 11 are modified systems depicted in FIGS. 4, 5, 6 and 7 respectively. The difference is in the existence of the membrane tank. The systems in FIGS. 4-7 have a separate membrane tank 60, but the systems in FIGS. 8-11 do not have a separate membrane tank 60. Namely, tanks 53 in FIGS. 8-11 function as both a membrane tank and as bioreactor. FIG. 12 shows further example of the processes developed in this invention which consists of simplest reactor configurations. Reciprocating membrane is submerged in a single bioreactor where both biological removal and membrane separation occur. The reactor can be aerated tank, pond or sequencing batch reactor (SBR) where aerobic and anoxic conditions are made in cyclic sequence.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A method of reducing membrane fouling of a membrane in a sequencing batch reactor of a reciprocating membrane bioreactor system, comprising:
   providing a reciprocating membrane bioreactor system comprising:
      a biological treatment train (50) for receiving influent (10) to be treated, the biological treatment train (50) producing treated wastewater;
      a membrane tank (60) housing a membrane (70), the treated wastewater from the biological treatment train (50) being filtered through the membrane (70) to produce effluent (40);
      a reciprocation apparatus (80) for reciprocating the membrane (70), the reciprocation reducing fouling on the membrane (70),
      wherein the reciprocation apparatus (80) comprises a motor (103) connected to a pulley (101) via a belt (102) to rotate a rotor (100) so as to convert rotational motion into reciprocating motion of a sliding frame (90) through a shaft (110), wherein the sliding frame is interconnected to the membrane so as to move the membrane submerged in the membrane tank in a horizontal reciprocating motion determined by a speed at which the rotor rotates,
      wherein the sequencing batch reactor includes the membrane tank, an anoxic tank, and an anaerobic tank within the biological treatment train,
   the method further comprising:
      submerging the membrane in the membrane tank of the sequencing batch reactor;
      mechanically moving the submerged membrane, by the reciprocation apparatus, in a horizontal reciprocating motion with respect to the membrane tank while the membrane is submerged in the membrane tank, thereby shaking foulants from the membrane surface and reducing membrane fouling of the membrane;
      returning activated sludge, using recirculation lines, from the membrane tank to an anoxic tank and an anaerobic tank of the sequencing batch reactor.

2. A method of reducing membrane fouling of a membrane in a sequencing batch reactor of a reciprocating membrane bioreactor system, comprising:
   providing a reciprocating membrane bioreactor system comprising:
      a biological treatment train (50) for receiving influent (10) to be treated, the biological treatment train (50) producing treated wastewater;
      a membrane (70), the treated wastewater from the biological treatment train (50) being filtered through the membrane (70) to produce effluent (40);
      a reciprocation apparatus (80) for reciprocating the membrane (70), the reciprocation reducing fouling on the membrane (70) and providing oxygen depleted conditions in the biological treatment train (50),
      wherein the reciprocation apparatus (80) comprises a motor (103) connected to a pulley (101) via a belt (102) to rotate a rotor (100) so as to convert rotational motion into reciprocating motion of a sliding frame (90) through a shaft (110), wherein the sliding frame is interconnected to the membrane so as to move the membrane submerged in a membrane tank in a horizontal reciprocating motion determined by a speed at which the rotor rotates,
      wherein the sequencing batch reactor includes the membrane tank, an anoxic tank, and an anaerobic tank within the biological treatment train,
   the method further comprising:
      submerging the membrane in a membrane tank of the sequencing batch reactor;
      mechanically moving the submerged membrane, by a reciprocation apparatus, in a horizontal reciprocating motion with respect to the membrane tank while the membrane is submerged in the membrane tank, thereby shaking foulants from the membrane surface and reducing membrane fouling of the membrane;
      returning activated sludge, using recirculation lines, from the membrane tank to the anoxic tank and the anaerobic tank of the sequencing batch reactor.

* * * * *